United States Patent [19]

Lauraitis

[11] 4,000,896
[45] Jan. 4, 1977

[54] COMPOSITE GOLF CLUB SHAFT
[75] Inventor: Kristina N. Lauraitis, Alliance, Ohio
[73] Assignee: The Babcock & Wilcox Company, New York, N.Y.
[22] Filed: July 17, 1975
[21] Appl. No.: 596,796

Related U.S. Application Data
[63] Continuation of Ser. No. 379,686, July 16, 1973, abandoned.
[52] U.S. Cl. .................. 273/80 R; 273/DIG. 23
[51] Int. Cl.² .............................. A63B 53/10
[58] Field of Search .......... 273/73 F, 80 R, 80 B, 273/80.9, DIG. 7, DIG. 23, 82 R; 43/18 GF; 280/11.13 L, 11.37 B, 11.37 D, 11.37 L

[56] References Cited
UNITED STATES PATENTS

| 1,796,274 | 3/1931 | Bryant | 273/80 R |
| 2,573,361 | 10/1951 | Rodgers et al. | 273/80 R X |
| 2,742,931 | 4/1956 | DeGanahl | 273/DIG. 7 |
| 3,260,010 | 7/1966 | Dubois | 273/DIG. 7 |
| 3,313,541 | 4/1967 | Benkoczy et al. | 273/80 R |
| 3,367,656 | 2/1968 | Medney | 273/DIG. 7 |
| 3,393,918 | 7/1968 | Styka | 280/11.13 L |
| 3,646,610 | 2/1972 | Jackson | 273/80 R |
| 3,700,535 | 10/1972 | McCoy et al. | 273/DIG. 23 |
| 3,889,951 | 6/1975 | Schaefer et al. | 273/DIG. 23 |
| 3,896,858 | 7/1975 | Whatley | 273/DIG. 7 |

FOREIGN PATENTS OR APPLICATIONS

| 1,261,541 | 1/1972 | United Kingdom | 273/80 R |
| 1,076,384 | 7/1967 | United Kingdom | 273/80 R |

Primary Examiner—Richard J. Apley
Attorney, Agent, or Firm—J. M. Maguire; J. P. Sinnott

[57] ABSTRACT

A hollow tapered tubular shaft formed of layers of carbonaceous fibers embedded in a resinous binder wherein each layer is oriented in different angles relative to an adjoining layer to provide a preferred physical characteristic to the tubular shaft.

6 Claims, 6 Drawing Figures

COMPOSITE GOLF CLUB SHAFT

This is a continuation, of application Ser. No. 379,686, filed July 16, 1973, now abandoned.

The invention relates to fiber reinforced plastic tubes and, more particularly to tubular shafts made of layers of a plastic such as epoxy reinforced with a combination of graphite and other carbonaceous fibers and particularly adapted to use in golf club shafts.

The basis of comparison of shafts for golf club service, particularly in drivers, is a hard wood shaft which has certain "feel" characteristics related to weight, flexibility and impact strength. Over the past years, many substitutes have been proposed and used for the wood shaft of a golf club driver and irons. Such shafts have been made of metal, as for example, stainless steels and aluminum, and, in addition, shafts have been made of fiberglass reinforced materials. The most accepted shaft of these has been the steel shaft which is used extensively and generally felt to have the best balance of properties of all those presently available. Some of the detriments of the other materials have been in the direction of weight, lack of torsional stiffness, and sometimes lack of sufficient strength to withstand service requirements. The main detriment of the steel shaft is its weight.

In the present invention, I have found that layers of carbonaceous an/or graphite filaments imbedded in epoxy can be assembled in a preferred pattern to attain balanced characteristics as to strength, flexibility and in particular torsional stiffness, so that the end product, i.e., a light weight golf club shaft, will quite closely correspond with a steel shaft insofar as user feel is concerned. This is accomplished by forming a plurality of layers of the fiber reinforced matrix with the fibers in each layer oriented at different angles with respect to the axis of the shaft. After the layer pattern is formed on a mandrel the raw shaft is cured while maintaining fiber orientation of the pattern to form the completed shaft. The shaft is hollow, tapered and is approximately 75% of the weight of a corresponding steel shaft.

Figure 1:
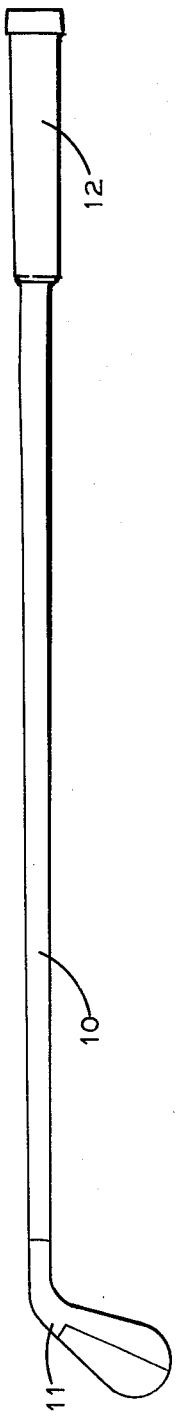
FIG. 1 is an elevation of a golf club having a shaft constructed according to the present invention.

As shown in FIG. 1, the invention is illustrated as applied in the usual golf club, where the shaft 10 of the invention is fitted into the head 11 and provided with a grip 12.

In general, the shaft 10 is constructed of multiple layers, each consisting of generally parallel fibers impregnated in a plastic matrix and having a thickness in the range 0.003 to .02 inches. Each of the layers is formed of generally parallel fibers where most fibers are at least 2 inches in length so that, in effect, the fibrous composition of each layer is continuous throughout the length of the layer. The fibers may be formed of any carbonaceous material, as for example, graphite or carbon fiber having a modulus of elasticity in the range of 27 - 80 $\times$ $10^6$ psi (pounds per square inch). Other forms of organic or carbonaceous fibers having a lower modulus of elasticity, as for example, around 20 $\times$ $10^6$ psi, may be used in some of the layers of the multiple layer construction of the shaft.

I prefer to use a high percentage of graphite and/or carbonaceous fibers since such material provides high strength with lightweight. One of the characteristics of such a fiber is its high modulus with considerably lower density relative to inorganic or glass fibers heretofore used.

In the structure of my invention, the number of layers forming the composite shaft may vary from a minimum of three to any reasonably larger number consistent with the thickness of the layers. Since the fibers are parallel to each other in each layer, I prefer to assemble the layers in a predetermined pattern so that many of the fibers are at an angle with respect to the axis of the shaft. This is primarily due to the characteristics of such layers in that the material properties such as strength and stiffness depend on the orientation of the fibers.

Figure 6:
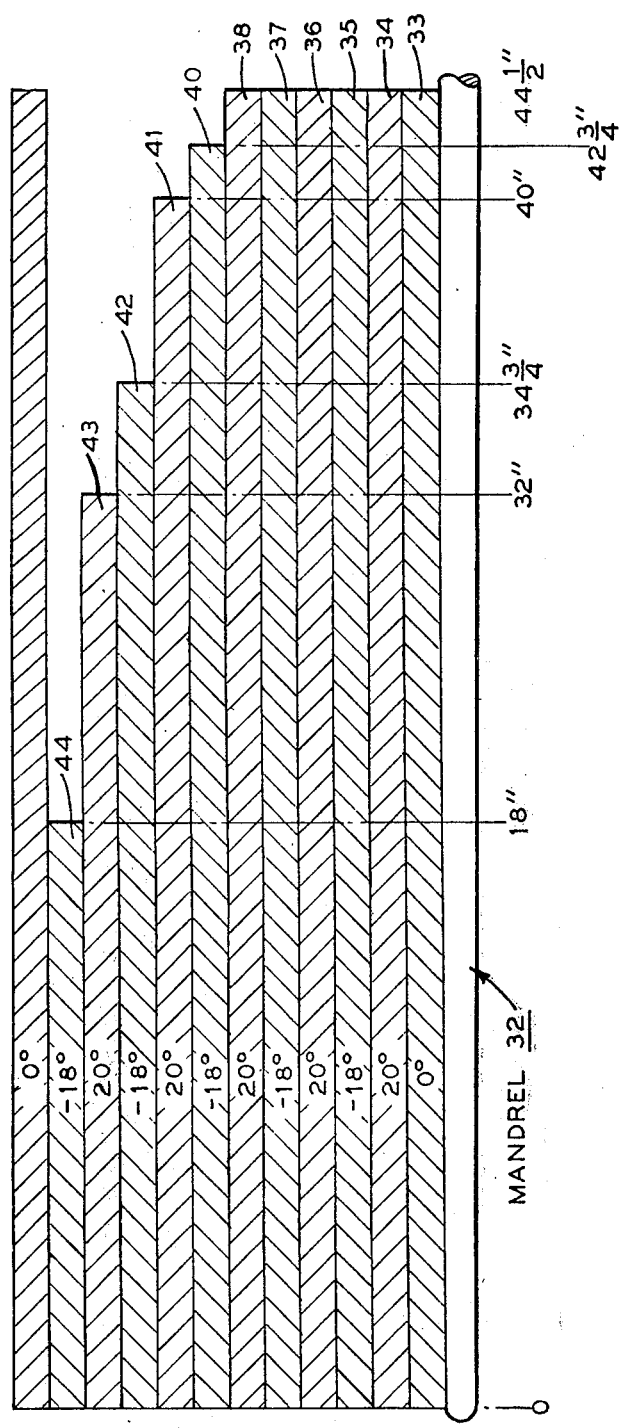
FIG. 6 illustrates another fiber pattern in accordance with the invention.

Generally speaking, the fiber angles in each layer of the composite shaft are formed at an angle to the axis of the shaft in the range of approximately 0° to plus or minus 45°. At the same time, I prefer that at least one-half of the layers will have their fibers oriented at an angle between plus or minus 10° and plus or minus 30° with respect to the axis of the shaft. For example, as shown in FIG. 6, at least one other of the layers extending the length of the shaft has the fibers therein oriented parallel to the longitudinal axis of the shaft.

In forming the tapered shaft for use in a golf club, it is desirable to have at least some of the layers extend the full length of the shaft while other layers will be less than the length of a shaft to form the taper and to vary the finished diameter of the shaft from a value such as 0.280 inches in diameter at the end attached to the golf club head 11 to an outer diameter of substantially ⅝ inches at the end forming the grip 12 for the golf club shaft. It will be apparent that the number of layers adjacent the head end of the shaft may be considerably more than that at the opposite end of the shaft due to the change in the outer diameter of the finished shaft.

Figure 2:
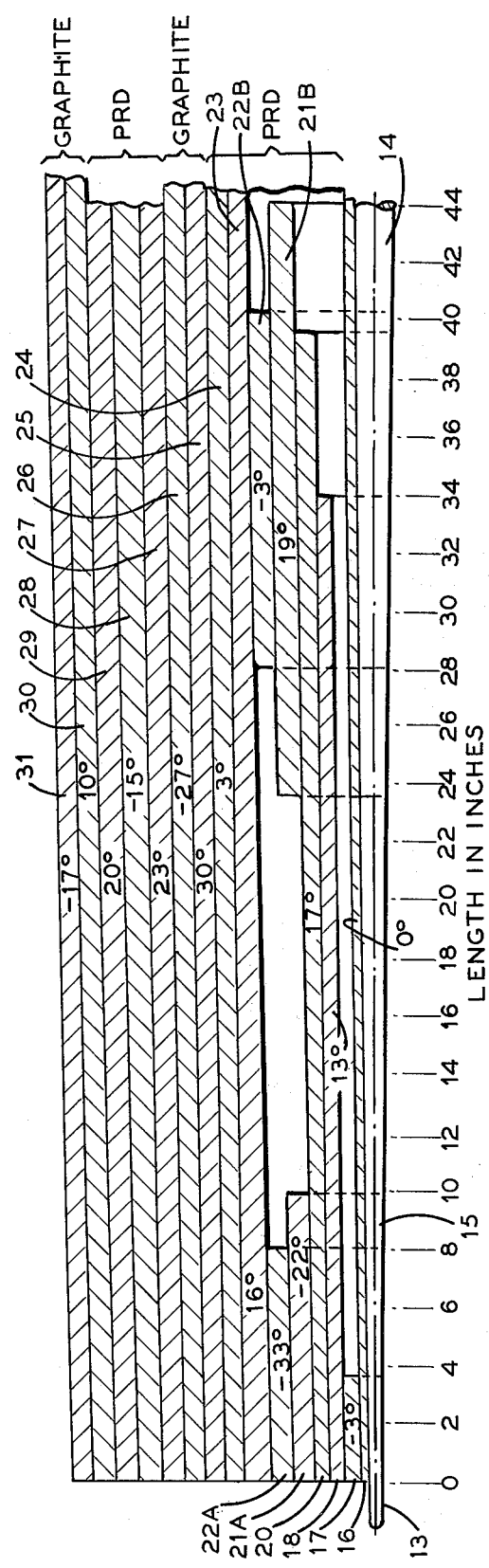
FIG. 2 is a diagramatic view of a preferred lay-up pattern of the shaft shown in FIG. 1.

As shown in FIG. 2 a specific example of a fiber lay-up or arrangement is illustrated to form a golf club shaft such as the shaft 10 of FIG. 1. It will be understood that the initial lay-up, in a preferred combination to attain the desired final characteristics of the finished shaft, must be treated under selected temperature and pressure conditions to cure the epoxy and to form the dimensions and configurations desired.

In the specific example shown the fibers, in an epoxy matrix, are purchased in strip or tape form, as commercially available. Since the golf club shaft in its finished form is hollow and tapers from the grip 12 to the head 11, the tape is set-up or laid-up on a tapered mandrel 15. In one embodiment, as illustrated in FIG. 2, the mandrel is not of the finished internal dimensions of the shaft 10.

There are many molding procedures available in the art for curing the epoxy, and other dimensions of a mandrel might be used for other curing procedures. However, in the present instance the mandrel tapers from a large end dimension 14 of approximately 0.500 of an inch to a small end dimension 13 of approximately 0.035 of an inch.

Regardless of the dimensions of the mandrel, the strips of fiber reinforced epoxy are preferably positioned on the mandrel as hereinafter described.

Figure 4:
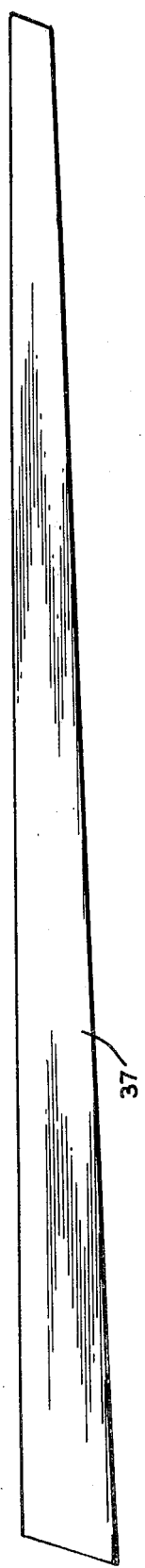
FIG. 4 is a typical fiber reinforced epoxy tape cut to fit a particular layer in the shaft lay-up of FIG. 2.

As shown in FIG. 2 the inner layer 16 adjacent the mandrel exterior surface, is positioned with the fibers of the tape paralleled to the longitudinal axis of the mandrel. This is indicated in FIG. 2 by use of the designation zero (0°) degrees. It will be understood that the layer 16 and the succeeding layers of fiber reinforced epoxy are cut prior to lay-up to fit the dimensions of the surface to which they are applied without any substantial overlap or gap between the edges of the tape when in its wrapped position. It will be, therefore, understood that each of the selected layers will be cut in elongated truncated triangular form as shown in FIG. 4.

As shown, the second layer 17 of fiber reinforced epoxy is applied for approximately a 4 inch length at the smaller diameter end of the mandrel and layer 16. This layer is angled at −3° from the longitudinal axis of the mandrel 15. In the drawing, this is designated as a minus 3° (−3°) from the longitudinal axis of the mandrel to indicate fiber alignment in one direction. The next adjacent layer 18 is approximately 34 inches long and is aligned at 13° in the opposite direction from the −3° layer. The fourth strip or layer 20 is approximately 40 inches long and is angled at 17° in the same direction as the immediately preceding layer 18.

The fifth layer 21 is installed in two pieces, the strip 21A adjacent the minimum diameter end of the mandrel is approximately 10 inches long and the fibers are inclined at an angle of −22° with a respect to the longitudinal axis of the mandrel. In the same layer 21 a separate strip 21B is installed adjacent the large end of the mandrel and extends for approximately 20 inches with an angle of 19° with respect to the axis of the mandrel 15. The sixth layer 22 also utilizes two strips of fiber reinforced tape, 22A for approximately 8 inches positioned adjacent the small end of the mandrel 15 and is installed at an angle of −33°, and another segment of fiber reinforced tape 22B is installed generally adjacent the larger end of the mandrel between dimension 28 and 40 of the shaft with a fiber orientation of −3°.

The seventh layer 23 extends substantially the full length of the shaft and has a fiber orientation of 16°. The succeeding outwardly positioned layers 24, 25, 26, 27, 28, 29 and 30 of fiber extend the full length of the shaft and successively are orientated +3°, +30°, −27°, +23°, −15°, +20°, +10° and −17°, respectively.

Essentially 15 layers of fiber reinforced tape are laid up to form the body of the shaft 10. As indicated on FIG. 2 the fiber reinforced tape in this specific example is formed of a series of carbonaceous tapes commercially known as PRD, sold by the Dupont Company, with successive layers of a graphite fiber tape as supplied commercially by Hercules Inc. In the specific example illustrated, the tape thicknesses vary between approximately 5/1000 of an inch and 25/1000 inch. Thus, when the shaft is subjected to curing temperatures and pressures the finished shaft will have an outside diameter of approximately 3/10 of an inch at one end and approximately 5/8 of an inch at the opposite end.

In the example shown in FIG. 2 the finished shaft 10 as shown in FIG. 1 will exhibit all of the required strength and physical characteristics desirable to form a golf club shaft.

It should be understood that minor changes in the relative angularity between successive layers of fiber reinforced epoxy tape can be utilized, to vary some of the characteristics of the finished shaft. While the inner layer 16 of fiber reinforced epoxy has an orientation of 0°, due to a particular arrangement for curing the shaft 10, the layer 16 may be differently oriented with an appreciable angle relative to the axis of the shaft, and still attain similar properties. As hereinbefore pointed out, the modulus of elasticity of the graphite fiber tape, such as layers 29 and 30 will vary from 45 to 80 × $10^6$ psi while the PRD will have a modulus of elasticity in the range of 20 to 25 × $10^6$ psi. It will further be understood that while commercially available fiber reinforced epoxy tapes in the range of thicknesses indicated have proven to be satisfactory it is also possible to utilize thicker tapes when they become commercially available and to use fewer layers in the set-up of the shaft. It should also be understood that the present commercially available tapes, of fiber reinforced epoxy have a volume ratio of fibers to epoxy in the range of 40 to 60 per cent.

It will be noted in the above description that discontinuous layers of fiber are used. While the drawing shows the layer pattern utilized in forming the shaft 10 having void spaces shown between successive layers of tape. Such void spaces are more apparent than real since the successive layers of flexible tape will largely fill these voids during lay up and any residual voids are filled by displacement of epoxy during the curing process. Moreover, the seam between edges of the wrapped tape portions will also be filled and sealed by epoxy during curing so that the hollow shaft will have a continuous wall and a smooth exterior surface in its finished form.

Figure 3:
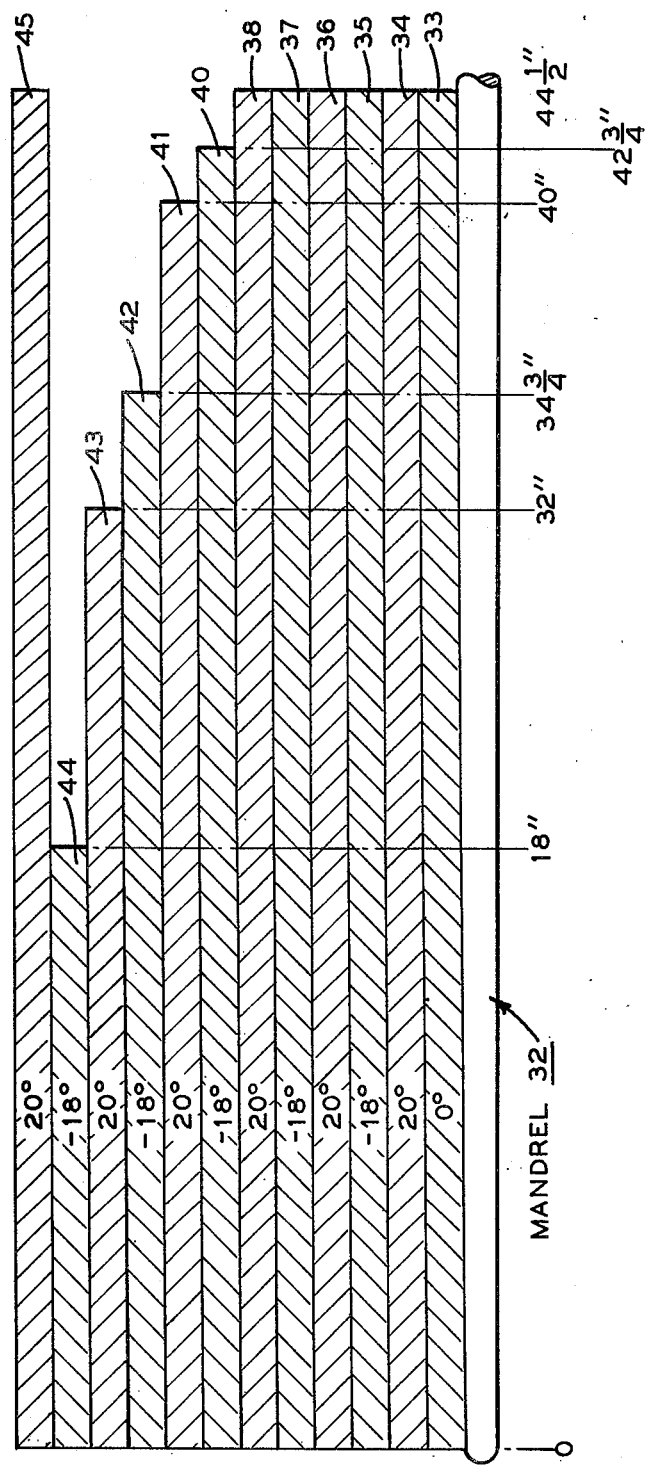
FIG. 3 is a diagramatic view of another preferred lay-up pattern utilizing an all graphite fiber reinforced epoxy of a golf club shaft.
Figure 5:
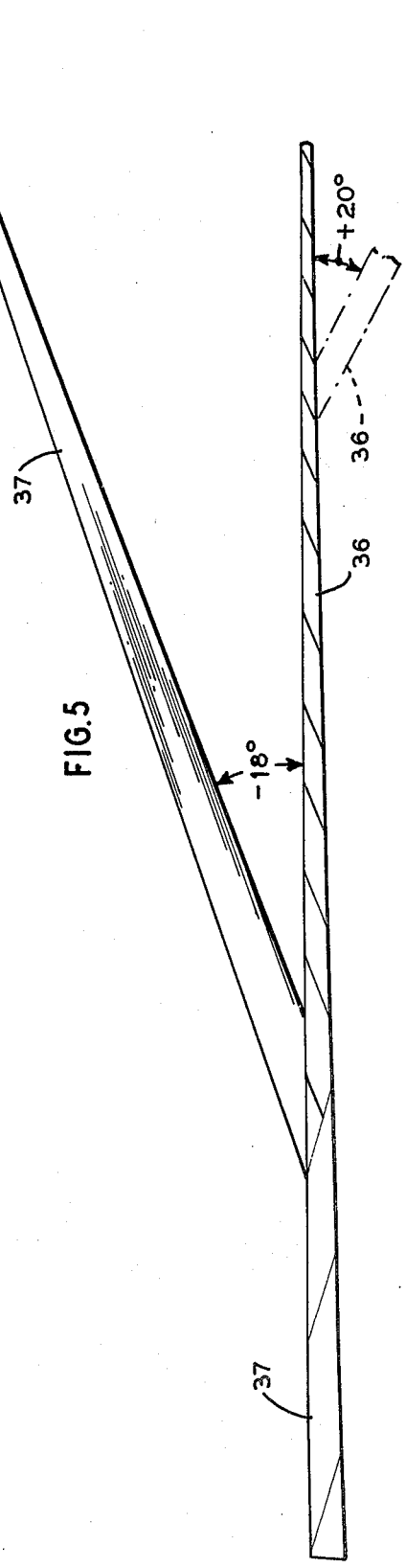
FIG. 5 illustrates the application of a cut tape as in FIG. 4 to form the shaft pattern of FIG. 2.

The shaft lay up pattern using an all graphite fiber reinforced epoxy shown in FIG. 3 is formed of tape having a modulus of elasticity in the range of from 27 to 40 × $10^6$ psi, and is somewhat thicker than the tape used in the FIG. 2 illustration. Accordingly fewer layers may be used to obtain the same or similar completed shaft dimensions. As shown, a tapered mandrel 32 is provided with a first layer 33 having 0° orientation, i.e. the fibers are arranged generally parallel to the axis of the mandrel 32. Outwardly successive layers 33 through 38 extend the full length of the mandrel 32 and are alternately oriented +20° and −18°. The layer 36, as formed, is shown in FIG. 5 with the layer 37 also shown in process of formation on the mandrel. Referring again to FIG. 3 the layers 40 through 44 continue the alternate fiber orientation, but are successively shorter in overall length. The outermost layer 45 extends the full length of the mandrel 32 and has a +20° orientation.

As hereinbefore pointed out a fiber reinforced epoxy golf shaft constructed as described will have substantially all of the physical characteristics of a steel shaft with approximately 75 percent of the weight required for a steel shaft.

The embodiments of the invention in which an exclusive property or privilege is claimed are defined as follows:

1. A fiber reinforced plastic tapered tubular golf club shaft comprising at least one inner layer of longitudinally extending carbonaceous fibers extending along the longitudinal axis of the shaft and a plurality of angularly disposed layers of carbonaceous fibers successively disposed over said inner layer; some of the angularly disposed layers having a length less than that of the shaft, the fibers in each one of said angularly disposed layers being substantially parallel, each layer of fibers in said angularly disposed layers being oriented at a different angle relative to the fibers of an adjoining layer in which at least some of said different angles are between plus 10° and plus 30° and between minus 10° and minus 30° relative to the longitudinal axis of the shaft with at least one of said angularly disposed layers extending the full length of the shaft, all of said layers forming the golf club shaft being of carbonaceous fibers impregnated with a resinuous binder in a cured state whereby all of said layers are unitarily joined and locked together and stress applied to any one layer is transmitted to all the other layers.

2. A fiber reinforced shaft as in claim 1 wherein at least some of the fibers are of graphite.

3. A fiber reinforced shaft as in claim 1 wherein all of the fibers are of graphite.

4. A fiber reinforced shaft as in claim 1 further comprising at least one other layer in addition to said inner layer, wherein said additional layer extends the length of the shaft and the fibers therein of said additional layer are oriented parallel to the longitudinal axis of the shaft.

5. A fiber reinforced shaft as in claim 3 wherein the fiber has a modulus of elasticity between 20 and 80 $\times$ $10^6$ psi.

6. A fiber reinforced shaft as in claim 1 wherein more layers of fibers are present in the smaller tapered end of the shaft than in the larger end.

* * * * *